Dec. 3, 1963 J. A. PIUMA 3,112,813
CONSTANT FLOW OIL DRIPPER
Filed Nov. 24, 1961
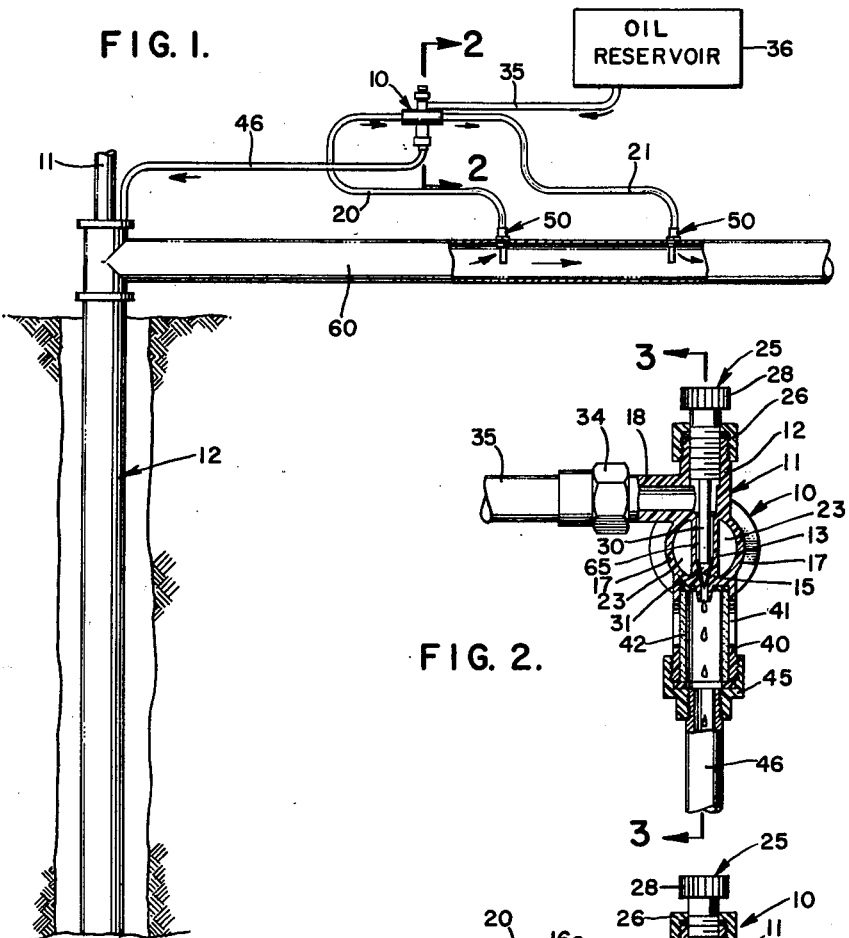
*INVENTOR.*
JOSEPH A. PIUMA
BY
ATTORNEYS.

United States Patent Office 3,112,813
Patented Dec. 3, 1963

3,112,813
CONSTANT FLOW OIL DRIPPER
Joseph A. Piuma, 228 N. Avenue 19, Los Angeles, Calif.
Filed Nov. 24, 1961, Ser. No. 154,525
6 Claims. (Cl. 184—6)

This application relates generally to valves for controlling the flow of fluids, and has particular reference to an improved oil drip valve.

A primary object of the present invention is to provide an oil drip valve incorporating means for automatically maintaining constant flow or passage of the oil through the valve, at any given valve setting, notwithstanding changes in viscosity of the oil occasioned by changes in the oil temperature.

A further object of the present invention is to provide a constant flow oil drip valve which is extremely simple in construction, having relatively few parts and adapted to be manufactured inexpensively of plastic or other materials.

A further object of the present invention is to provide an oil drip valve embodying means for the circulation of a heat-exchange fluid for maintaining the temperature and hence the viscosity of the oil passing through the valve at a substantially constant value.

Still another object of the present invention is to provide a novel constant drip oil valve in combination with novel means for circulating a heat-exchange fluid in heat-exchange relationship with said valve.

The general method employed to lubricate bearings in deep well water pumps and in other equipment such as, for example, refrigeration system compressors, is to employ oil directed drop-wise onto the bearings by means of a manually adjustable needle valve or the like, commonly referred to as an oil drip valve. Such devices are quite satisfactory in use so long as the oil is not subject to temperature changes. However, when used for the lubrication of deep well pumps and other devices, the oil is exposed to wide variations in temperature, especially in the western and southwestern portions of the United States, wherein atmospheric temperature changes of 30°–40° F. within a twenty-four hour period are quite usual. Under such conditions, the conventional oil drip valves prove to be considerably troublesome, inasmuch as the viscosity of the oil changes markedly with change in temperature, either reducing or increasing the flow of oil through the valve and into the bearings, causing on the one hand possible damage to the bearings, and on the other hand waste of oil. The only solution heretofore to this problem has been constant checking of the flow of oil through the valve and repeated manual adjustment of the valve in an attempt to maintain a reasonably constant flow of oil therethrough. The present invention solves this problem and provides means whereby the flow of oil through a drip valve is maintained substantially constant under wide temperature variations, with little or no supervision by the equipment operator and without any necessity for additional operating cost.

Briefly, the above and other objects and advantages of this invention are accomplished by providing the drip valve with a jacket or other means for the circulation of a heat-exchange fluid in heat-exchange relationship with the body of the valve so as to maintain the temperature of the oil passing therethrough at a substantially constant value. A preferred embodiment of the invention, as applied to the lubrication of deep well water pumps, comprises the circulation of a small portion of the water being pumped in heat-exchange relationship with the valve for temperature control thereof.

Other objects and advantages of the present invention, it is believed will be readily apparent from the following detailed description of a preferred embodiment thereof, when read in connection with the accompanying drawings.

In the drawings:

FIGURE 1 is a diagrammatic side elevation, partly in section, illustrating the apparatus of the present invention.

FIGURE 2 is a sectional elevation taken substantially on the line 2—2 of FIGURE 1.

FIGURE 3 is a sectional elevation taken substantially on the line 3—3 of FIGURE 2.

FIGURE 4 is a vertical sectional elevation of a water bleed-off or return fixture utilized in connection with the present invention.

FIGURE 5 is a sectional elevation taken substantially on the line 5—5 of FIGURE 4.

Referring now to the drawings, the constant oil drip valve 10 of the present invention is shown as applied to the lubrication of the bearings (not shown) on the shaft 11 of a pump (not shown) submerged in a water well 12. While this application constitutes a preferred embodiment of the present invention, it is to be understood that the invention is not to be so limited, and the valve 10 is adapted to be used in other types of lubricating systems.

Referring now to FIGURES 2 and 3, the valve 10 comprises a valve body 11 comprising a generally cylindrical upper portion 12, a tubular side extension member 18, a generally cylindrical central portion 13, of reduced diameter with respect to the portion 12, the interior wall of the portion 13 forming a conical valve seat 15. Also forming an integral part of the valve body 10 are a pair of oppositely-extending tubular members 16 and 17 which merge together on either side of the portion 13 opposite the center thereof, the members 16 and 17 forming a jacket surrounding the portion 13 and the valve seat 15. Thus, the tubular members 16 and 17, which are provided with tapered, circumferentially grooved outer surfaces 16a and 17a for the reception of flexible inlet and outlet tubes 20 and 21, provide a passageway 23 for the circulation of heat-exchange fluid therethrough in heat-exchange relationship with the portion 13 and the valve body and its associated parts in general.

The upper portion 12 of the valve body 10 is internally threaded for the reception of a valve member 25 and externally threaded for the reception of a seal bushing 26. The valve member has on the upper end thereof an axially-grooved head portion 28 for manual adjustment of the valve, and is provided at its lower end with a valve stem 30 having a conical end 31 adapted to seat on the valve seat 15.

The tubular extension 18 is provided at its outer end with threads (not shown) for the reception of a connection fitting 34 of an oil supply line 35 leading from the oil reservoir 36.

The lower portion of the valve body 10 has a generally cylindrical wall 40 provided with oppositely disposed inspection ports 41, a transparent tubular member 42 being disposed interiorly of the wall 40 to prevent leakage of oil through the ports. The lower end of the wall 40 is threaded for the reception of a sealing collar 45, the lower end of which is in turn internally threaded for the reception of the oil outlet line 46.

In the embodiment shown in FIGURE 1, the oil outlet line 46 extends into the casing of the well 12 for lubrication of the pump bearings in the usual manner. Means are provided for circulating or passing a portion of the water being pumped through the passage 23 in heat-exchange relationship with the valve 10, and as shown in the drawings, these means may include a pair of fittings 50 of identical construction. As shown in FIGURE 4, these are generally tubular, having at one end a tapered, circumferentially grooved surface 51 for the reception of one of the flexible lines 20 or 21, a central body portion 52 having external threads and a hexagonal tool-receiving head portion 53, and a generally cylindrical lower portion 54 with a closed end 55, but with a longitudinal side opening 56. The fittings 50 are installed in tapped holes in the wall of the water outlet pipe 60 as shown in FIGURE 1. It is to be noted that the fitting 50 to which the water inlet tube 20 is attached is positioned in the discharge line 60 with the opening 56 facing the direction of flow of water in the line 60, whereas the fitting 50 to which the water outlet tube 21 is attached is disposed in the outlet line 60 with the opening 56 facing in the opposite direction, i.e. downstream with respect to the flow of water through the line 60.

In operation of the device thus described, the valve member 25 is turned to open the valve to an extent necessary to provide the desired number of drops of oil flowing therethrough per unit time, as observed visually through the ports 41. In use of the valve, a portion of the water being pumped is passed from the inlet fixture 50 through the line 20, into heat-exchange relationship with the valve body 11 and particularly the narrow annulus 65 through which the oil flows, the water then flowing through the outlet tube 21 to be returned to the discharge line 60 through the other fitting 50. During any given season of the year and indeed throughout the year in many sections of the contry, the water from water wells remains at a substantially constant temperature, and thus by means of the valve of the present invention, the flow of such water therethrough maintains the oil passing through the valve at substantially the same constant temperature. By this means, the viscosity of the oil is maintained substantially constant, and in turn the drop-wise flow of oil through the valve remains uniform and constant at any given valve setting.

It is to be understood that for applications other than that described above, and in fact in such an application, fluids other than water may be utilized as heat-exchange media for maintenance of substantially constant temperature of the valve body and the oil flowing therethrough.

Having fully described my invention, it is to be understood that I do not wish to be limited to the details set forth, but my invention is of the full scope of the appended claims.

I claim:
1. In a lubrication system for a deep well water pump, said well having a water discharge line, the combination of an oil reservoir; an oil drip valve assembly, said valve assembly comprising a valve body having walls forming a central chamber with a valve seat, a valve member having a valve stem cooperating with said seat for varying the flow of oil through said valve, inlet means leading to said chamber for admission of oil thereto, and means on said valve body for passing a fluid in heat-exchange relation with the oil in said chamber comprising a jacket surrounding said central chamber; an oil supply line leading from said reservoir to said inlet means; and means connected to said water discharge line and to said valve for passing a portion of the water being pumped through said line into heat-exchange relationship with said valve, said last-named means including a tubular fitting projecting radially into said line, said fitting having an opening facing in the direction of flow of water being pumped through said line, and said valve assembly including visual inspection means for determining the drop-wise flow of oil through said valve seat.

2. The combination of claim 1, including means connected to said valve and said water discharge line for returning water from said valve assembly to said water discharge line, said means including a fitting extending radially into said water discharge line and having an opening facing away from the direction of flow of water being pumped through said line.

3. The combination of claim 2, wherein a portion of the central chamber is formed by elongated, cylindrical walls, the valve stem is cylindrical and cooperates with said cylindrical walls to form a narrow, elongated annulus for the passage of oil through said valve assembly, and wherein the jacket surrounds said cylindrical walls and encompasses said annulus so that the water is passed in direct, heat-exchange relation with said cylindrical walls.

4. An oil drip valve assembly for use in lubricating deep well water pumps, said assembly being of the type which is incorporated in a lubricating system including an oil reservoir and an oil supply line leading from the reservoir to the valve assembly, said drip valve assembly comprising a valve body including walls forming an elongated central chamber with a valve seat at one end thereof, an elongated portion of said walls being cylindrical, a valve member having a valve stem extending through said chamber and cooperating with said seat for varying the flow of oil through said valve assembly, said valve stem being cylindrical and cooperating with said cylindrical walls to define a narrow, elongated annulus for the passage of oil therethrough, oil inlet means adapted to be connected to the oil supply line, said inlet means leading to said chamber at the end thereof remote from said valve seat, walls forming a heat-exchange jacket surrounding said cylindrical walls and encompassing said annulus, and means for connecting said jacket to a line leading from the well for circulating water from the well in direct, heat-exchange relation with said cylindrical walls.

5. The valve assembly as defined in claim 4, wherein said jacket comprises a pair of oppositely-disposed tubular members integral with said valve body, and including visual inspection means for determining the drop-wise flow of oil through said valve seat.

6. The combination of claim 1, wherein a portion of the central chamber is formed by elongated, cylindrical walls, the valve stem is cylindrical and cooperates with said cylindrical walls to form a narrow, elongated annulus for the passage of oil through said valve assembly, and wherein the jacket surrounds said cylindrical walls and encompasses said annulus so that the water is passed in direct, heat-exchange relation with said cylindrical walls.

References Cited in the file of this patent
UNITED STATES PATENTS

| | | |
|---|---|---|
| 532,469 | Lonergan | Jan. 15, 1895 |
| 741,309 | Clarke | Oct. 13, 1903 |
| 810,911 | Clark | Jan. 30, 1906 |
| 1,178,646 | Johnson | Apr. 11, 1916 |
| 1,461,520 | Forman | July 10, 1923 |
| 1,526,646 | Smith et al. | Feb. 17, 1925 |
| 2,283,118 | Arutunoff | May 12, 1942 |